United States Patent
Cobb

(10) Patent No.: US 11,203,920 B2
(45) Date of Patent: Dec. 21, 2021

(54) DATA STREAM CONTROLLER WITH CONFIGURABLE BARRIER FOR JOIN AND AGGREGATION

(71) Applicant: ConocoPhillips Company, Houston, TX (US)

(72) Inventor: Bradford L. Cobb, Houston, TX (US)

(73) Assignee: ConocoPhillips Company, Houston, TX (US)

(*) Notice: Subject to any disclaimer, the term of this patent is extended or adjusted under 35 U.S.C. 154(b) by 252 days.

(21) Appl. No.: 16/366,061

(22) Filed: Mar. 27, 2019

(65) Prior Publication Data
US 2019/0301270 A1    Oct. 3, 2019

Related U.S. Application Data

(60) Provisional application No. 62/648,677, filed on Mar. 27, 2018.

(51) Int. Cl.
| | | |
|---|---|---|
| E21B 47/007 | (2012.01) | |
| E21B 43/00 | (2006.01) | |
| E21B 44/04 | (2006.01) | |
| E21B 41/00 | (2006.01) | |
| G06K 9/62 | (2006.01) | |
| E21B 44/08 | (2006.01) | |

(Continued)

(52) U.S. Cl.
CPC .......... E21B 41/0092 (2013.01); E21B 44/04 (2013.01); E21B 44/08 (2013.01); E21B 47/007 (2020.05); G06F 11/07 (2013.01); G06F 11/3051 (2013.01); G06K 9/6289 (2013.01)

(58) Field of Classification Search
CPC .......... E21B 47/007; E21B 43/00; E21B 44/04
See application file for complete search history.

(56) References Cited

U.S. PATENT DOCUMENTS

| | | | |
|---|---|---|---|
| 5,828,858 A | 10/1998 | Athanas et al. | |
| 2005/0279532 A1* | 12/2005 | Ballantyne | E21B 49/00 |
| | | | 175/40 |

(Continued)

FOREIGN PATENT DOCUMENTS

| | | |
|---|---|---|
| KR | 101443117 B1 | 9/2014 |
| WO | 2015119703 A1 | 8/2015 |

OTHER PUBLICATIONS

International Search Report and Written Opinion dated Jun. 10, 2019 in corresponding International Patent Application No. PCT/US2019/024234, 8 pages.

(Continued)

*Primary Examiner* — David E Martinez
(74) *Attorney, Agent, or Firm* — Polsinelli PC

(57) ABSTRACT

A method, system, and apparatus are provided for a configurable streaming operator to join or aggregate input data streams in a streaming application topology. The configurable operator may include a configuration data stream that allows for the selection of a varying number of input streams to join or aggregate. Introducing the configuration stream into a streaming operator allows the underlying operator to selectively use the remaining input streams based on the configuration stream as well as influencing the resulting output stream as defined by the configuration stream to provide flexibility in handling various configurations with a minimum and/or maximum of input streams.

20 Claims, 5 Drawing Sheets

(51) Int. Cl.
    *G06F 11/07*      (2006.01)
    *G06F 11/30*      (2006.01)

(56) References Cited

U.S. PATENT DOCUMENTS

| | | |
|---|---|---|
| 2007/0215384 A1* | 9/2007 | Ingerslew ............... E21B 44/00 |
| | | 175/40 |
| 2010/0097890 A1 | 4/2010 | Sullivan et al. |
| 2012/0118637 A1 | 5/2012 | Wang et al. |
| 2012/0272174 A1 | 10/2012 | Vogel et al. |
| 2015/0083493 A1* | 3/2015 | Wassell ................... E21B 44/00 |
| | | 175/40 |
| 2016/0333673 A1 | 11/2016 | Anno et al. |
| 2017/0096889 A1 | 4/2017 | Blanckaert et al. |
| 2017/0126578 A1 | 5/2017 | Amulothu et al. |

OTHER PUBLICATIONS

The Extended European Search Report for European Application No. 19776289.1 dated Oct. 22, 2021 (9 pages).

\* cited by examiner

DATA STREAM CONTROLLER WITH CONFIGURABLE BARRIER FOR JOIN AND AGGREGATION

CROSS-REFERENCE TO RELATED APPLICATION

This application claims the benefit of U.S. Provisional Application Ser. No. 62/648,677, filed Mar. 27, 2018, which is incorporated herein by reference in its entirety.

BACKGROUND

1. Field of the Invention

The present inventive concept relates to acquisition of signals associated with drilling wells for hydrocarbons. In particular, the present inventive concept concerns a system and method with a real-time configurable barrier operator for joining and/or aggregating streams of data received in a stream computing and analysis topology received during drilling operation to adjust the topology for the addition or subtraction of input streams.

2. Description of Related Art

The process of forming an oil or gas well presents a number of challenges due to changing and uncertain drilling conditions, which may result in high operating costs due to inefficiencies and/or damage to drilling equipment. For example, hydrocarbon reservoirs may be accessed or developed through drilling operations using a drill bit associated with a drill string rotated from the surface or using a downhole motor, or both using a downhole motor and also rotating the string from the surface. In an attempt to improve the efficiency of such drilling operations, it is often desirable to obtain drilling data related to the drilling conditions during the process to permit an operator to adapt the drilling process. In one particular example, a bottom hole assembly (BHA) at the end of the drill string may include measuring components, such as logging tools, sensors, and/or other types of measuring tools to obtain drilling data downhole. A BHA is also capable of telemetering various drilling and geological parameters to surface facilities and/or surface measuring devices may be employed to further obtain drilling data.

Managing the dynamic conditions that lead potentially to failure of downhole equipment is important for enhancing efficiency and minimizing costs for drilling wells. Various conditions referred to as drilling dysfunctions that may lead to component failure include excessive torque, shocks, bit bounce, induced vibrations, bit whirl, stick-slip, among others. These conditions must be rapidly detected and processed so that mitigation efforts are undertaken as quickly as possible, since some dysfunctions can quickly lead to tool failures.

Thus a need exists for efficient methods, systems and apparatuses to quickly identify and to mitigate dysfunctions during drilling operations based on drilling data obtained from within the wellbore or at the surface of the drilling site. Rapid aggregation and analysis of data from multiple sources associated with well bore drilling operations facilitates efficient drilling operations by timely responses to drilling dysfunctions.

Accordingly, there is a need for improved methods, systems and apparatuses for the accurate adjustment of timing for sensors in downhole environments.

SUMMARY

The present inventive concept provides a method, system, and apparatus for a configurable streaming operator to join or aggregate input data streams in a streaming application topology. The configurable operator may include a configuration data stream that allows for the selection of a varying number of input streams to join or aggregate. Introducing the configuration stream into a streaming operator allows the underlying operator to selectively use the remaining input streams based on the configuration stream as well as influencing the resulting output stream as defined by the configuration stream to provide flexibility in handling various configurations with a minimum and/or maximum of input streams.

The aforementioned may be achieved in an aspect of the present inventive concept by providing a process or method for configuring an analytics engine. The method may include the operations of receiving, via a computing device, a plurality of input streams of data from one or more sensors to a streaming application, the streaming application comprising at least one configurable operator receiving at least a subset of the plurality of input streams of data and detecting, via the computing device, a change in a number of input streams of data from the one or more sensors to the streaming application. The method may also include the operations of generating, via the computing device and in response to detecting the change in the number of input streams of data, a configuration data input stream comprising an identification of active input streams of data to the configurable operator and configuring, via the computing device, the at least one configurable operator by providing the configuration data input stream as an input stream to the configurable operator, the configurable operator configured in response to the identification of the active input streams of data to the configurable operator.

The aforementioned may be achieved in another aspect of the present inventive concept by providing a system comprising a processor and a non-transitory storage medium for tangibly storing thereon program logic for execution by the processor is provided. The program logic may comprise application logic executed by the processor to create a streaming application for processing a plurality of input streams of data from one or more sensors, the streaming application comprising at least one configurable operator receiving at least a subset of the plurality of input streams of data and detecting logic executed by the processor to detect a change in a number of input streams of data from the one or more sensors to the streaming application. The program logic may further include generating logic executed by the processor to generate a configuration data input stream in response to detecting the change in the number of input streams of data, the configuration data input stream comprising an identification of active input streams of data to the configurable operator and configuring logic executed by the processor to configure the at least one configurable operator by providing the configuration data input stream as an input stream to the configurable operator, the configurable operator configured in response to the identification of the active input streams of data to the configurable operator.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present inventive concept. It should be understood, however, that the present inventive concept is not limited to the precise embodiments and features shown. The accompanying drawings, which are incorporated in and constitute a part of this specification, illustrate an implementation of apparatuses consistent with the present inventive concept and, together with the description, serve to explain advantages and principles consistent with the present inventive concept.

DETAILED DESCRIPTION

Figure 1:
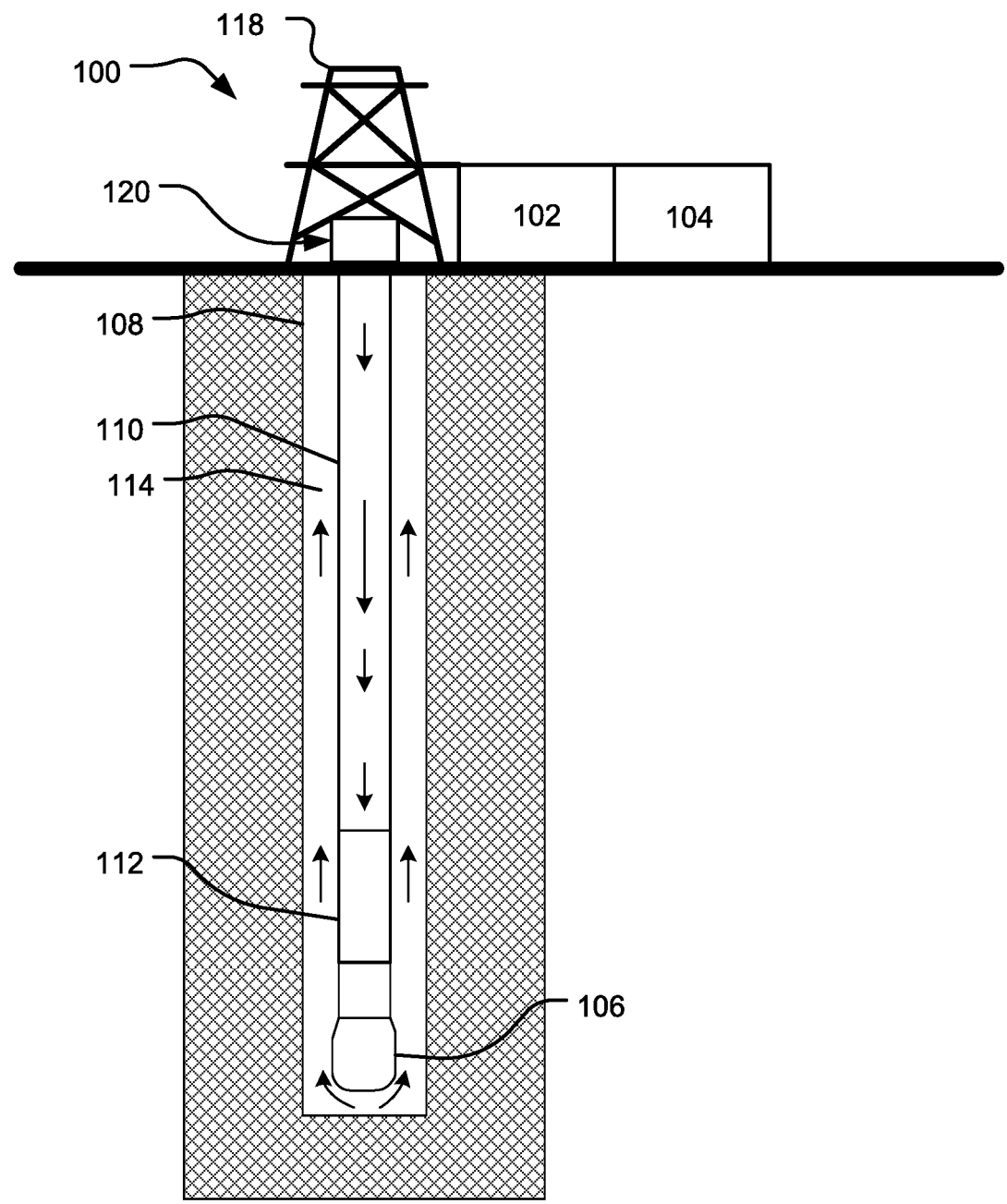
FIG. 1 is a diagram illustrating a system of the present inventive concept with a drilling rig, one or more surface sensors, and supporting facilities in use with a wellbore and drill string.

The following detailed description references the accompanying drawing that illustrates various embodiments of the present inventive concept. The illustration and description are intended to describe aspects and embodiments of the present inventive concept in sufficient detail to enable those skilled in the art to practice the present inventive concept. Other components can be utilized and changes can be made without deviating from the scope of the present inventive concept. The following detailed description is, therefore, not to be taken in a limiting sense. The scope of the present inventive concept is defined only by the appended claims, along with the full scope of equivalents to which such claims are entitled.

Aspects of the present inventive concept involve systems, methods, computer program products, and the like, for a configurable barrier operator to join or aggregate input streams in a data stream controller. In particular, data obtained during a drilling operation may include several input streams from one or more sensors and/or data-gathering devices. A computing device associated with the drilling operation may process the multiple input streams through one or more streaming applications. Such streaming applications typically build rigid topologies of streams and operators to process the incoming streaming data that results in a built-for purpose application. The rigid topologies may include points or operators within the topology that join or aggregate multiple data for a new output data stream that may be provided as the output of the application or may be used as an input to another operator of the topology. However, because the topology of such applications are generally rigid, adding a new input stream (such as from a new sensor device or a new channel in a multi-channel data collection device) requires the creation of a new streaming application topology to accept and process the new input stream.

As such, a configurable streaming application topology is introduced herein that provides for the configuration of one or more join or aggregation operators in a streaming application topology. In one particular implementation, the streaming topology may include a configuration data stream that allows for the selection of a varying number of input streams to join or aggregate. Introducing the configuration stream into a streaming operator allows the underlying operator to selectively use the remaining input streams based on the configuration stream as well as influencing the resulting output stream as defined by the configuration stream to provide flexibility in handling various configurations with a minimum and/or maximum of input streams. For example, an operator of a streaming application may be configured to join a minimum of three data streams up to five data streams. The stream application topology may include an operator that includes a configuration stream that determines the number of input streams to be joined. In one instantiation, the operator may appear as join(configStream, s0, s1, s2, s3, s4) to join any number of input streams s0-s4 based in the information included in the configStream data stream. In other words, the configStream data stream includes the information of which of input data streams s0-s4 are active and are to be joined by the operator. Through this configurable barrier or operator, a single streaming application topology may be built or designed that can accommodate various configurations of the number of data streams. The use of configurable barriers may provide more flexibility to the streaming topologies while reducing application development and maintenance costs to create multiple applications supporting any number of topology configurations.

Turning now to the detailed description of the preferred arrangement or arrangements of the present inventive concept, it should be understood that the inventive features and concepts may be manifested in other arrangements and that the scope of the present inventive concept is not limited to the embodiments described or illustrated. The scope of the present inventive concept is intended only to be limited by the scope of the claims that follow.

The following examples of certain embodiments of the present inventive concept are given. Each example is provided by way of explanation of the present inventive concept, one of many embodiments of the present inventive concept, and the following examples should not be read to limit, or define, the scope of the present inventive concept.

Turning to FIG. 1, a drilling system 100 of the present inventive concept is illustrated in use with a drilling rig 118 having a top drive motor 120 at the surface attached to a drill string 110. The drilling rig 118 includes the drill string 110 extending into the wellbore 108 with one or more surface sensors 102 and supporting facilities 104 positioned at a top of the wellbore 108. The wellbore 108 extends into the ground and is formed via a drilling operation using the drill string 110. A depth of the wellbore 108 can range from a few feet to multiple miles into the ground and can extend in one or more directions. The drill string 110 includes a drill pipe and a bottom hole assembly (BHA) 112 positioned at a bottom of the drill string 110. The BHA 112 can include a plurality of components. In the exemplary embodiment, the BHA 112 includes a steering unit, a mud motor, a drill motor, a drill collar, and a drill bit 106. It is foreseen that the BHA 112 may include fewer or additional components without deviating from the scope of the present inventive concept. The drill string 110 extends into the wellbore 108 so that the drill bit 106 of the BHA 112 is in contact with a geological formation to crush and/or scrape the geological formation, thereby increasing a length of the wellbore 108 in a downward direction, a lateral direction, and/or any other suitable direction. In the exemplary embodiment, the drill bit 106 is driven by the top drive motor 120 and/or the mud motor positioned near the drill bit 106.

A drilling mud or a drilling fluid 114 can be continuously circulated within the wellbore 108 via a pump to facilitate operation of the BHA 112, e.g., drilling. The drilling fluid 114 can be introduced into the drill string 110 via an opening of the drill string 110 and pumped down the drill string 110 via the pump. The drilling fluid 114 exits the drill string 110 through the drill bit 106 and circulates upwards through an annulus of the wellbore 108. The drilling fluid 114 has multiple functions including, but not limited to, cooling the drill bit 106, lubricating the drill bit 106, and/or transporting debris generated by the drill bit 106 away from the drill bit 106, e.g., up the annulus of the wellbore 108 and to the surface of the wellbore 108. The drilling fluid 114 may be water, oil, a synthetic based composition, gas, or a combination thereof, and may include one or more additives and/or particles.

Each of the one or more surface sensors 102 are configured to measure drilling data, for example, a surface torque of the drill string 110 and yield a data stream of the drill string torque. In one particular implementation, the surface sensors 102 may be configured to measure weight on bit (WOB), lateral acceleration, rotations per minute (RPM), tension, flow rate, temperature, pressure, or any other suitable data related to the drill string 110 during drilling that can be measured from the surface without deviating from the scope of the present inventive concept. The surface sensors 102 may be, or include, a strain gauge, accelerometer, gyroscope, and/or seismometer without deviating from the scope of the present inventive concept. Further, the one or more surface sensors 102 may be configured to measure same or different data relative to each other.

In the exemplary embodiment, the surface sensors 102 are positioned on the drill string 110, at or adjacent to the top of the drill string 110 at a surface of the wellbore 108, but it is foreseen that the surface sensors 102 can be positioned along any portion of the drill string 110 proximate to or above the surface of the wellbore 108 without deviating from the scope of the present inventive concept. For instance, it is foreseen that the surface sensors 102 can be in a sub positioned under the top drive motor 120 without deviating from the scope of the present inventive concept.

Figure 2:
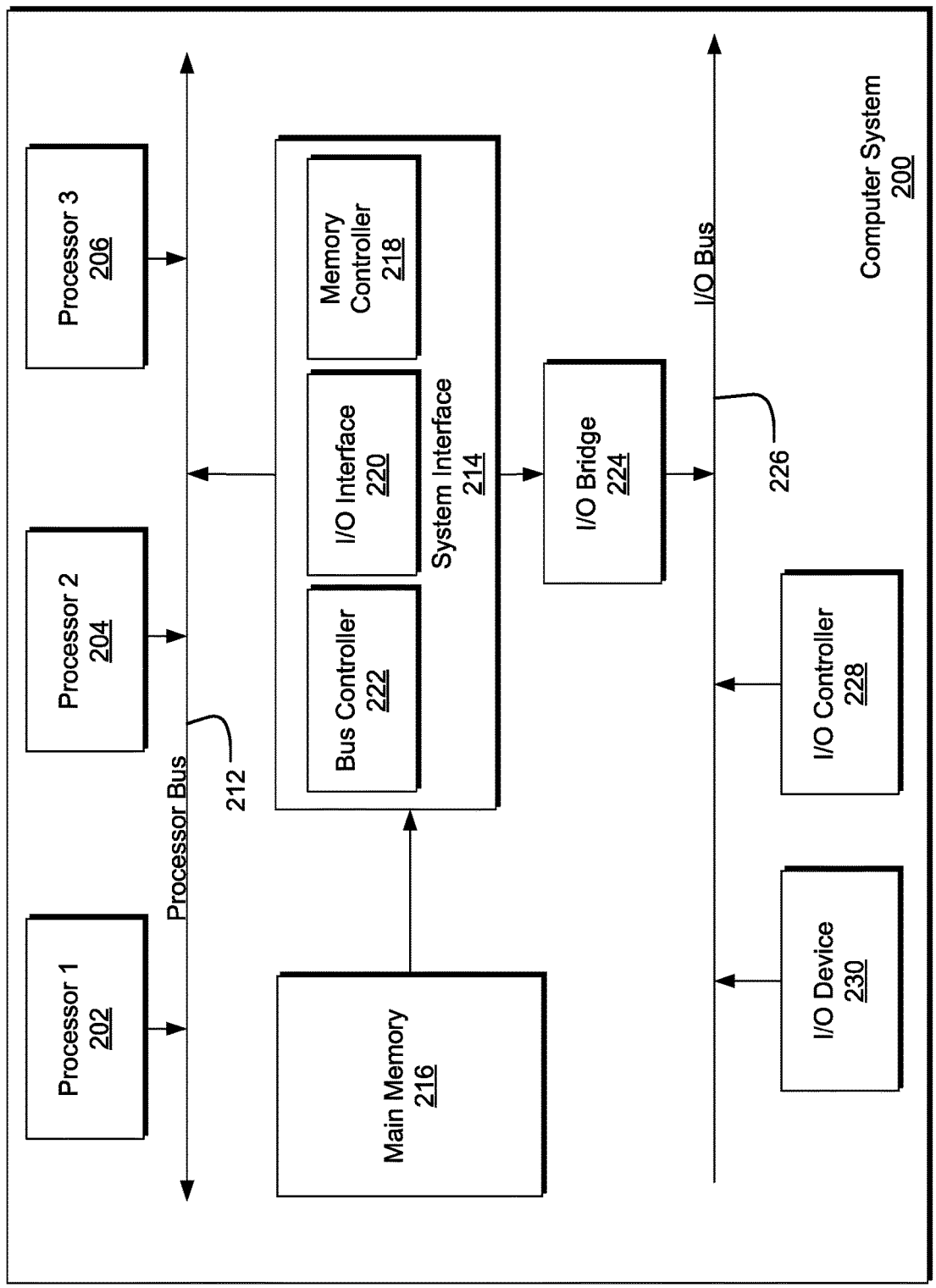
FIG. 2 is a diagram illustrating the supporting facilities of FIG. 1 having a computing device and a clock.

The supporting facilities 104 may include a computing device in some implementations. FIG. 2 is a block diagram illustrating an example of a computer system or a computing device 200 which may be used in implementing the embodiments of the supporting facilities 104 discussed above. For example, the computing device 200 of FIG. 2 may process streams of data from the one or more surface sensors 102 associated with the drill string 110. In general, the computing device 200 includes one or more processors 202-206. Processors 202-206 may include one or more internal levels of cache (not shown) and a bus controller or bus interface unit to direct interaction with the processor bus 212. Processor bus 212, also known as the host bus or the front side bus, may be used to couple the processors 202-206 with the system interface 214. System interface 214 may be connected to the processor bus 212 to interface other components of the computing device 200 with the processor bus 212. For example, system interface 214 may include a memory controller 218 for interfacing a main memory 216 with the processor bus 212. The main memory 216 typically includes one or more memory cards and a control circuit (not shown). System interface 214 may also include an input/output (I/O) interface 220 to interface one or more I/O bridges or I/O devices with the processor bus 212. One or more I/O controllers and/or I/O devices may be connected with the I/O bus 226, such as I/O controller 228 and I/O device 230, as illustrated. The system interface 214 may further include a bus controller 222 to interact with processor bus 212 and/or I/O bus 226.

I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

The computing device 200 may include a dynamic storage device, referred to as main memory 216, or a random access memory (RAM) or other computer-readable devices coupled to the processor bus 212 for storing information and instructions to be executed by the processors 202-206. Main memory 216 also may be used for storing temporary variables or other intermediate information during execution of instructions by the processors 202-206. The computing device 200 may include a read only memory (ROM) and/or other static storage device coupled to the processor bus 212 for storing static information and instructions for the processors 202-206. The system set forth in FIG. 2 is but one possible example of the computing device 200 that may employ or be configured in accordance with aspects of the present inventive concept.

According to one embodiment, the above techniques may be performed by the computing device 200 in response to processor 204 executing one or more sequences of one or more instructions contained in main memory 216. These instructions may be read into main memory 216 from another machine-readable medium, such as a storage device. Execution of the sequences of instructions contained in main memory 216 may cause processors 202-206 to perform the process steps described herein. In alternative embodiments, circuitry may be used in place of or in combination with the software instructions. Thus, embodiments of the present inventive concept may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 216. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 3:
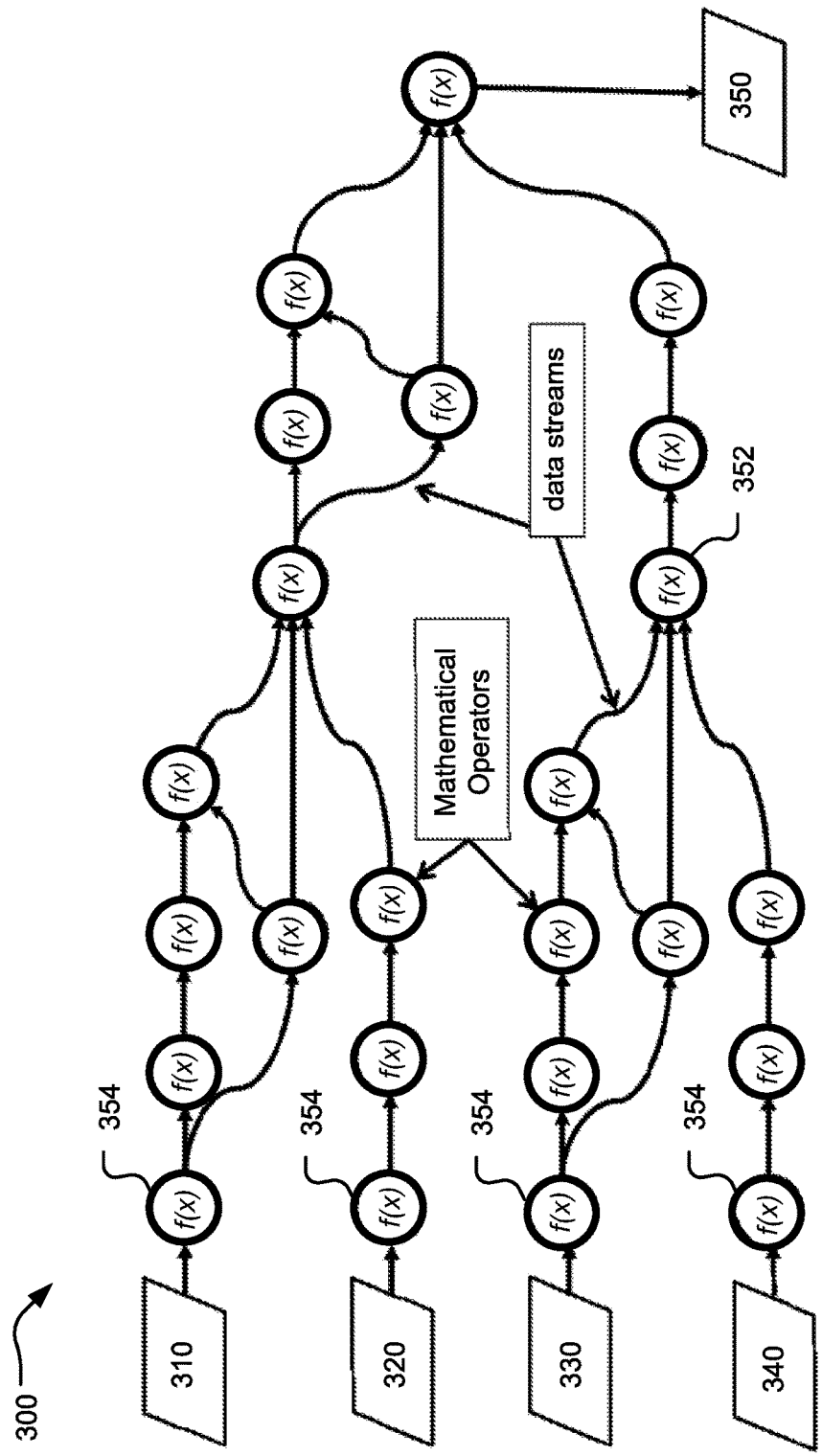
FIG. 3 is a flow diagram of a streaming application topology in which one or more configurable operators may be utilized.

The computing device 200 described above may execute one or more programs, applications, code, etc. (collectively referred to herein as a "streaming application") to receive inputs in the form of data streams from the one or more surface sensors 102 and process the data streams to analyze the received information. In one embodiment, the streaming application may take the form of a stream computing paradigm or topology to flow data samples through a processing graph of networked mathematical operators, interconnected by data streams. An example streaming application 300 is schematically illustrated in FIG. 3. In general, data ingestion into the streaming application 300 is continuous with many input data streams, flowing time-ordered data samples through the graph to apply continuous analytics. In one particular implementation, the streaming application 300 is provided access to data from all drilling operation sensors, communication systems and hardware needed to stream data in and out of it. A collection of mathematical operators are designed, positioned, and connected within the flow of data streams such that the aggregate action of the processing graph yields the desired analyses and output streams at each exit point of the processing graph. FIG. 3 schematically depicts the structure of input data streams to the processing graph, and output analytics and drill rig data control streams via an output data stream 350, though it will be appreciated that a processing graph is not limited to one exit, nor is the streaming application limited to processing information related to a drilling operation. Rather, the embodiments described herein may be applied to any type of streaming application. In the instance where the streaming application 300 is utilized in a drilling operation, the output data stream 350 may be an analysis of the input data streams to provide an indication to a user of the application as to an operational status of the drilling operation. For example, the output data stream 350 may include dysfunction indices, mechanical specific energy, rig state, borehole conditions, toolwear and rig control feedback.

As mentioned, the streaming application 300 may input several streams of data via one or more of the data input streams 310-340 for analysis and processing. For example, the inputs to the streaming application 300 of FIG. 3 may include conventional measures for monitoring well drilling operations such as hook load and torque (input 310), high fidelity surface measurements such as RPM, torque, bending, tension, pressure and acceleration (input 320), downhole measurements telemetered to the surface such as Measurements While Drilling/Logging While Drilling (MWD/LWD), temperature, directional information, data stored in memory, and other 'wired pipe' information both stored and telemetered (input 330), and/or other data associated with drilling operations such as Quality Assurance/Quality Control data, and other commercially provided information or data acquired from third party vendors onsite associated with the well operations (input 340). In general, any type of streaming data input may be utilized by the streaming application 300 of FIG. 3.

The streaming application 300 includes data flow coordination and analysis through a topology that include ingestion of diagnostic drilling data, feedback, and drilling control parameters into a processing graph of networked mathematical operators 354. Data flow coordination and analysis includes data formatting for flow through the streaming application 300 as well as for visualization at strategic positions within the graph and upon exiting the graph (the output data stream 350). Thus, the streaming application 300 may be illustrated as a connection between the operators 354 that process inputs received at each operator. The operators 354 of the streaming application 300 or topology may perform any function on the input data streams, including but not limited to, joining input streams, aggregating input streams, filter data streams, multiplying input streams, perform mathematical functions, etc.

In one particular implementation, an operator 352 of the streaming application 300 or topology may join or aggregate multiple input streams. For example, the operator 352 receives three input streams and outputs one input stream. The operator 352 (also referred to as a "barrier") may thus join the three input streams into a single data stream and output the single data stream. Other operators within the streaming application 300 may also perform a similar join or aggregation. Through the topology, the input data streams 310-340 are processed by the streaming application 300 and the output data stream 350 is provided for analysis by an administrator or user of the streaming application.

Typically, a join operator of a streaming application is a fixed operator in that the number of data streams to be joined is pre-selected upon creation of the streaming application topology. For example, the operator 352 may be selected by a designer or programmer of the streaming application 300 when building or creating the application. Thus, if the designer desires to combine or join three data streams of information into a single data stream output, the designer selects a three-to-one join operator and places the operator into the streaming application 300 in the desired location. In one implementation, the designer may call a join operation of the form join(s0, s1, s2), where s0-s2 identify the data streams of the application topology to be joined. However, if new inputs are added to the streaming application topology (such as through the addition of a new sensor or source of data or by a redesign of the processing of the existing data streams) that are to also be joined at the operator 352, a new topology may be created by calling a new join operator that includes four input streams. In other words, the streaming application 300 designer may redesign the topology by calling different operators to process the new input data stream.

To provide more flexibility to the streaming application 300 and to reduce the time and costs for a redesign of the topology when a new input stream is added, a configurable barrier or operator is introduced herein. In general, the configurable join or aggregation operator may utilize a configuration data stream that allows for the selection of a varying number of input streams to the join or aggregate operator. Introducing the configuration stream into a streaming operator allows the underlying operator to selectively use the remaining input streams based on the configuration stream as well as influencing the resulting output stream as defined by the configuration stream to provide flexibility in handling various configurations with a minimum and/or maximum of input streams.

Figure 4:
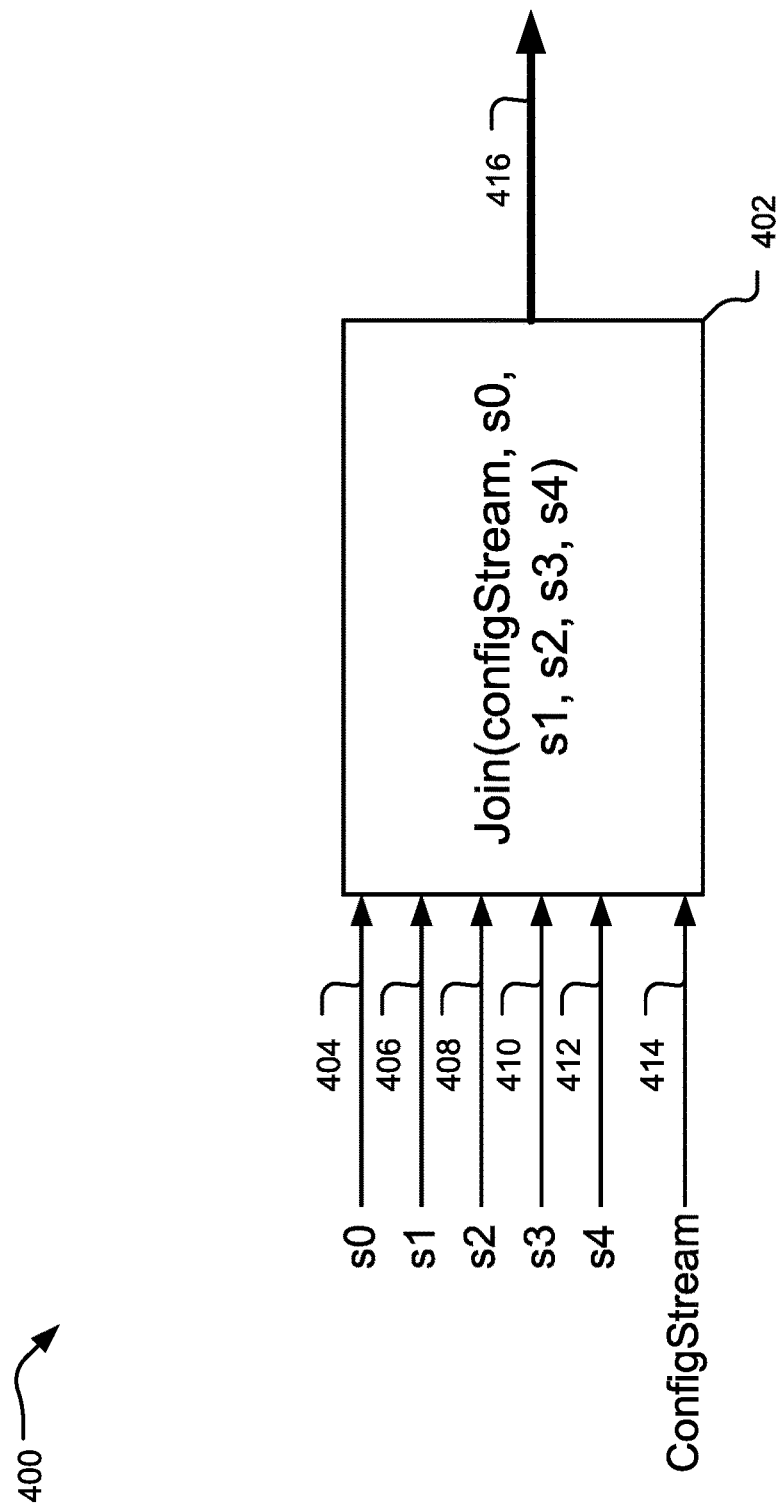
FIG. 4 is a diagram illustrating a configurable barrier operator of a streaming application topology for joining input data streams.

In particular, FIG. 4 is an illustration of a configurable barrier operator 402 of a streaming application that allows for the topology to provide an indication of the number of input data streams to be joined through a configuration input data stream 414. By providing the number of input data streams to be joined on the configuration input data stream 414, the operator may determine the number of input data streams to combine or join. This allows the configurable operator 402 to be configurable as needed by the data streaming application. The configurable operator 402 may be selected by the topology designer in place of rigid join or aggregation operators to allow the topology to be configured as new data streams are added or taken away from the data stream application.

As shown in FIG. 4, the configurable join the configurable operator 402 may include several input data streams 404-412, labeled in the figure as streams s0-s4. An output data stream 416 of the joined streams is also provided. As discussed above, the configurable operator 402 may be utilized in the streaming application 300 to join or aggregate multiple input data streams and output a single data stream as the output data stream 416 to another operator of the application topology or as the output of the application itself. In general, the configurable operator 402 may input any number of the input data streams 404-412 to be joined into the output data stream 416. Further, in other embodiments, the configurable operator 402 may include any number of output data streams, other than a single output stream. As such, the configurable operator 402 may input any number of data streams as designed within the streaming application 300 and may output any number of data streams as the output data stream 416.

In addition to the input data streams s0-s4, the configurable join the configurable operator 402 may also receive the configuration input data stream 414. In general, the configuration input data stream 414 provides information or data that indicate to the configurable operator 402 the number and identification of input data streams to the operator to be joined. For example, the configuration input data stream 414 may include a series of packets that identify the input data streams to be joined by the configurable operator 402. Thus, at a first time, the configuration input data stream 414 may identify input data streams s0-s2 (404-408) to be joined by the operator. At a second time, input data stream s3 410 may be added as an input to the streaming application 300 and/or the configurable operator 402 as an active input. The configuration input data stream 414 may then provide information to the configurable operator 402 to join or aggregate data streams s0-s3 (404-410). The configurable operator 402 may, in response to the information provided on the configuration input data stream 414, alter the number and identity of the input data streams 404-412 that are being joined into the output data stream 416. In this manner, the number and identity of the input data streams 404-412 to be joined by the configurable operator 402 may be adjusted through the information provided by the configuration input data stream 414.

In a similar manner as input data streams are added to the join operation of the configurable operator 402, input data streams may be removed from the output data stream 416. Thus, a change in the information provided on the configuration input data stream 414 to remove an input stream may be processed by the configurable operator 402 to remove an input data stream from the join operation. This may be done when an input data stream is removed from the streaming application 300 or topology. Through the information provided on the configuration input data stream 414, the input data streams 404-412 to the configurable operator 402 to be joined may be selected by the application in response to which data streams have information to be joined. Thus, as new data streams are added to the streaming application 300 for processing or data streams are removed, the join operators of the topology may be configured accordingly without the need to redesign the application topology.

In some implementations, the configuration input data stream 414 may include information that identifies the input data streams to be joined by the configurable operator 402. Thus, the configuration input data stream 414 may include some identification of such input streams. For example, the data packets provided on the configuration input data stream 414 may include an identification of stream s0 404, stream s1 406, and stream s2 408 to be joined into the output data stream 416. In one implementation, the identification of the streams may include a unique bit string that is associated with a particular input to the configurable operator 402. Other embodiments may identify the stream inputs to be joined through other identifier types. The addition or subtraction of one or more input stream identifiers on the configuration input data stream 414 may configure the configurable operator 402 to alter which data stream inputs are joined by the operator. In this manner, the streaming application 300 may control which inputs are joined by the configurable operator 402 to allow for changes in the input streams and overall topology of the application.

Figure 5:
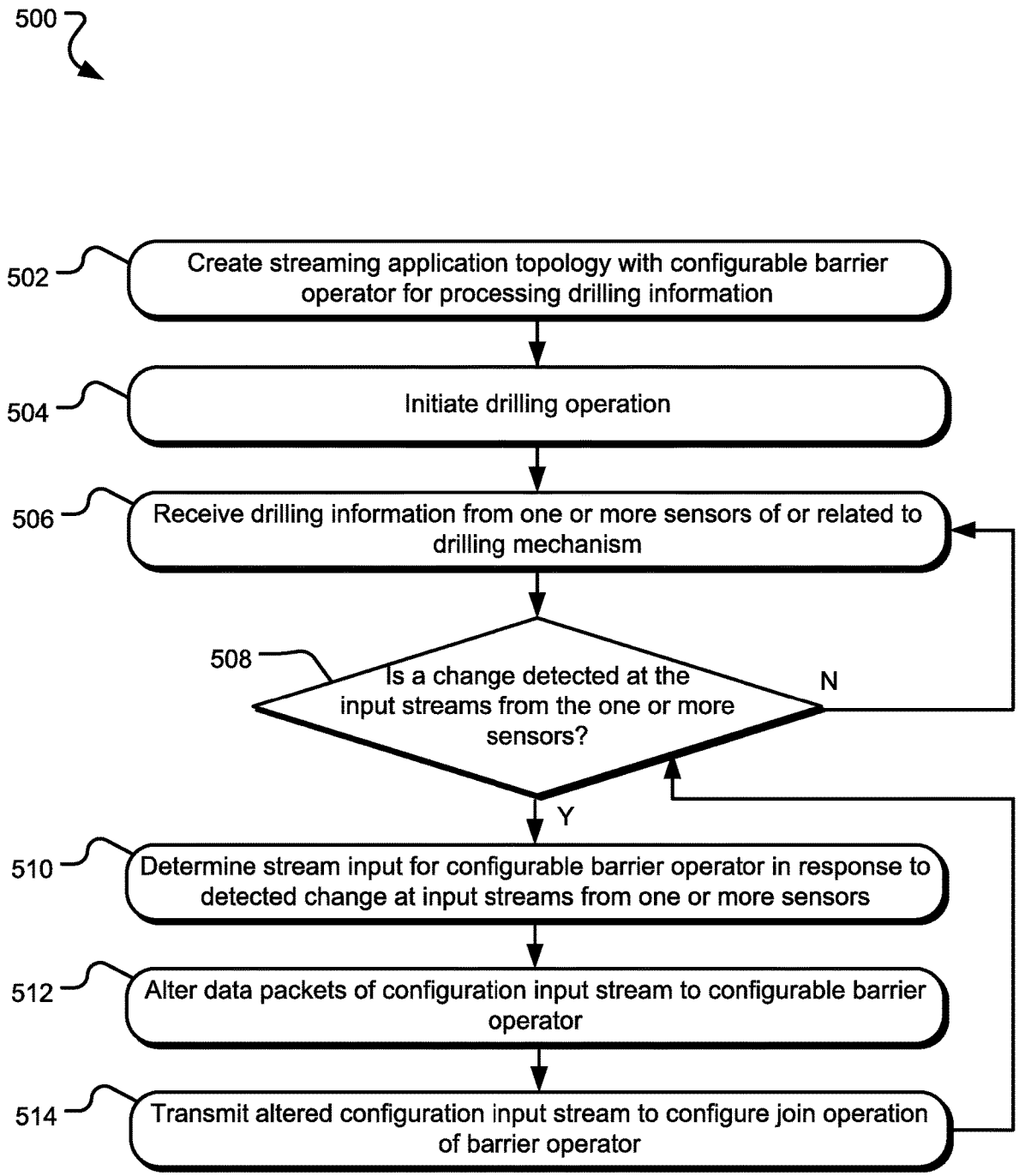
FIG. 5 is a flowchart of a method for configuring a configurable operator of a streaming application to join multiple input streams of data.

FIG. 5 is a flowchart of a method 500 for configuring a configurable operator of a streaming application to join multiple input streams of data. In some embodiments, the operations of the method 500 may be performed by the computing device 200 discussed above during a drilling operation. The operations may be performed by hardware components of the computing device, through the execution of software programs, or through a combination of hardware and software. Through the method 500, the computing device 200 may configure at least one configurable operator of a streaming application topology in response to the addition or subtraction of a data input stream from one or more sensors related to the drilling operation.

Beginning in operation 502 and as part of a drilling operation, a streaming application topology may be created to process streams of analysis data received from one or more sensors associated with the drilling operation. Such input streams may include data from surface sensors or downbore sensors and provide information on the drilling operation, such as rotations per minute of a drill string, bit depth, drill string torque, and the like. A drilling analyzer may prepare the application topology to receive the input streams and process the data into an output signal that provides some indication for the performance of the drilling operation and/or control signal for controlling aspects of the drilling operation. It should be appreciated, however, that operations of the method 500 may also be utilized in relation to other streaming applications in other fields of inquiry.

The created streaming application topology utilizes one or more configurable operators or elements. For example, an application creator may select a configurable join or aggregate operator for use within the application topology to join multiple data stream inputs into a single or multiple output streams. An example configurable operator (also referred to as a "barrier") is illustrated and discussed above with relation to FIG. 4. Once the streaming application topology is created, a drilling operation may commence in operation 504 such that data from the operation is received at and process by the streaming application for use by a drilling administrator or system in operation 506. As described, one or more downbore or surface sensors may provide continual streams of data to the streaming application for processing and analysis. The data streams from these sensors arrive as stream inputs to the application, and more particularly to one or more operators of the streaming application topology.

In operation 508, the computing device 200 detects a change in the number of inputs streams from the one or more sensors of the drilling operation. In one example, a new sensor may be added to a collection of sensors associated with the drilling operation, the output of which is provided to the streaming application for analysis with the existing sensors. In another example, a new input channel from a multi-channel sensor may be activated to provide another input data stream to the streaming application for analysis with current streaming inputs. In yet another example, a flow of data through the streaming application may be activated in response to a condition of the drilling operation that provides a new input stream to an operator of the application topology. Regardless of the circumstance, a change in the number of input streams at a configurable operator of the streaming application may be detected. If no change is detected, the method 500 returns to operation 506 to receive additional drilling information from the one or more sensors.

However, if a change in the input streams of data is detected in operation 508, the computing device 200 may proceed to operation 510 and determine if a stream input at a configurable operator is activated at a particular configurable barrier operator in response to the change in input data streams. For example, a particular configurable operator may receive multiple input data streams to join, but not all of the input streams may be active at one point. The addition of a new input stream to the streaming application may activate a previously un-active input data stream to the configurable barrier. In another example, an input stream may be removed from the streaming application by the removal or deactivation of a particular sensor. In such a case, the computing device 200 may determine if the removal of the input stream to the application also removes an input stream to the configurable operator. Thus, in operation 510, the computing device 200 determines a change in the activated input data streams for the configurable operator of the streaming application topology.

In operation 512, the computing device 200 may create or alter informational data packets intended for a configuration input stream to the configurable operator of the streaming application. As described above, the configurable barrier of the application may include a configuration data stream that identifies a number and/or type of input data stream to the configurable barrier to be joined. For example, the configuration data stream may include data packets included bit strings that identify one or multiple input data streams to the configurable barrier. The computing device 200 may thus determine and create the data packets to be sent on the configuration data stream to the configurable barrier to instruct the barrier on which input data streams to join. This determination may be based on the change in input data streams to the streaming application mentioned above. In another example, the removal of an input stream to the application may cause the computing device 200 to remove an identification of an input data stream to the configurable barrier on the configuration data stream.

In operation 514, the computing device 200 may transmit the altered configuration data stream information to the configurable barrier to configure the input data streams to the barrier that are joined. In other words, the computing device 200 may configure the number of data input streams joined by the barrier through the information provided to the barrier over the configuration data stream. As such, through the method 500 of FIG. 5 the computing device 200 may configure one or more operators of the streaming application in response to changes at the data input streams without the need to redesign a new application topology by altering the information provided to the configurable operators over the configuration data stream input.

Embodiments of the present inventive concept include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present inventive concept. However, it is understood that the described disclosure may be practiced without these specific details. In the present inventive concept, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present inventive concept and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present inventive concept has been described with reference to various embodiments, it should be understood that these embodiments are illustrative and that the scope of the disclosure is not limited to them. Many variations, modifications, additions, and improvements are possible. More generally, embodiments in accordance with the present inventive concept have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

In closing, it should be noted that the discussion of any reference is not an admission that it is prior art to the present inventive concept, especially any reference that may have a publication date after the priority date of this application. At the same time, each and every claim below is hereby incorporated into this detailed description or specification as additional embodiments of the present inventive concept.

What is claimed is:

1. A method to configure an analytics engine in a drilling system, the method comprising:
    receiving a plurality of input streams of data at a streaming application from one or more sensors of the drilling system, the plurality of input streams of data including drilling data, the streaming application comprising an input processing graph of operators including at least one configurable operator receiving at least a subset of the plurality of input streams of data;
    detecting a change from a first number of the plurality of input streams of data being received at the streaming application to a second number of the plurality of input streams of data being received at the streaming application;
    generating a configuration data input stream for the second number of the plurality of input streams of data, the configuration data input stream comprising an identification of active input streams of data being received at the at least one configurable operator; and
    configuring the at least one configurable operator to join the active input streams by providing the configuration data input stream as an input stream to the at least one configurable operator.

2. The method of claim 1, wherein the at least one configurable operator joins the active input streams of data into a single output stream of data.

3. The method of claim 1, wherein the at least one configurable operator joins the active input streams of data into a plurality of output streams of data.

4. The method of claim 1, wherein the change from the first number of the plurality of input streams of data being received at the streaming application to the second number of the plurality of input streams of data being received at the streaming application comprises an addition of an input stream of data to the plurality of input streams of data.

5. The method of claim 1, wherein the change from the first number of the plurality of input streams of data being received at the streaming application to the second number of the plurality of input streams of data being received at the streaming application comprises a removal of an input stream of data from the plurality of input streams of data.

6. The method of claim 1, wherein the change from the first number of the plurality of input streams of data being received at the streaming application to the second number of the plurality of input streams of data being received at the streaming application comprises an addition of an input stream channel.

7. The method of claim 1, wherein the plurality of inputs streams of data comprise data packets associated with at least one of a lateral acceleration, a rotations per minute (RPM), a tension, a flow rate, a temperature, or a pressure associated with a drill string of a drilling operation.

8. The method of claim 1, wherein the identification of the active input streams of data comprises at least a unique bit string for each of the active input streams of data.

9. The method of claim 1, further comprising:
outputting, via the at least one computing device, an output stream of data of the streaming application, the output stream of data based on the plurality of input streams of data and an output stream of data of the at least one configurable operator.

10. The method of claim 9, wherein the output stream of data of the streaming application includes at least one of a dysfunction indices, a mechanical specific energy, a rig state, a borehole condition, a toolwear feedback, or a rig control feedback.

11. A system to configure an analytics engine in a drilling system, the system comprising:
one or more sensors measuring drilling data and outputting the drilling data as a plurality of input streams of data; and
at least one computing device in communication with the one or more sensors, the at least one computing device generating a streaming application that processes the plurality of input streams of data by executing application logic, the streaming application including an input processing graph of operators including at least one configurable operator receiving at least a subset of the plurality of input streams of data, the at least one computing device detecting a change from a first number of the plurality of input streams of data from the one or more sensors being received at the streaming application to a second number of the plurality of input streams of data form the one or more sensors being received at the streaming application, the at least one computing device generating a configuration data input stream for the second number of the plurality of input streams of data, the configuration data input stream comprising an identification of active input streams of data being received at the at least one configurable operator, and the at least one computing device configuring the at least one configurable operator by providing the configuration data input stream as an input stream to the at least one configurable operator, the at least one configurable operator configured in response to the identification of the active input streams of data to the at least one configurable operator.

12. The system of claim 11, wherein the one or more sensors are associated with a drilling operation.

13. The system of claim 11, wherein the one or more sensors are positioned on a surface of a wellbore.

14. The system of claim 11, wherein the one or more sensors include at least one of a strain gauge, an accelerometer, a gyroscope, or a seismometer associated with the drilling operation.

15. The system of claim 11, wherein the one or more sensors are positioned below a surface of a wellbore.

16. The system of claim 11, wherein the one or more sensors includes a multi-channel sensor, the multi-channel sensor measuring additional drilling data and outputting the additional drilling data as an input stream channel.

17. The system of claim 11, wherein the at least one computing device outputs an output stream of data of the streaming application, the output stream of data based on the plurality of input streams of data and an output stream of data of the at least one configurable operator.

18. The system of claim 17, wherein the output stream of data of the streaming application includes at least one of a dysfunction indices, a mechanical specific energy, a rig state, a borehole condition, a toolwear feedback, or a rig control feedback.

19. A system to configure an analytics engine in a drilling system, the system comprising:
one or more sensors measuring drilling data of a drillstring of a wellbore and outputting the drilling data as a plurality of input streams of data;
at least one computing device in communication with the one or more sensors, the at least one computing device generating a streaming application that processes the plurality of input streams of data by executing application logic, the streaming application including an input processing graph of operators including at least one configurable operator receiving at least a subset of the plurality of input streams of data, the at least one computing device detecting a change from a first number of the plurality of input streams of data from the one or more sensors received at the streaming application to a second number of the plurality of input streams of data from the one or more sensors received at the streaming application, the at least one computing device generating a configuration data input stream for the second number of the plurality of input streams of data, the configuration data input stream comprising an identification of active input streams of data being received at the at least one configurable operator, and the at least one computing device configuring the at least one configurable operator by providing the configuration data input stream as an input stream to the at least one configurable operator, the at least one configurable operator configured in response to the identification of the active input streams of data to the at least one configurable operator, the at least one computing device outputting an output stream of data of the streaming application, the output stream of data of the streaming application based on the plurality of input streams of data and an output stream of data of the at least one configurable operator; and
a controller in communication with the at least one computing device, the controller receiving the output stream of data of the streaming application and controlling the drill-string by generating a control signal based on the output stream of data of the streaming application.

20. The system of claim 19, wherein the output stream of data of the streaming application includes at least one of a dysfunction indices, a mechanical specific energy, a rig state, a borehole condition, a toolwear feedback, or a rig control feedback.

* * * * *